(12) United States Patent
Ohtani et al.

(10) Patent No.: US 9,694,522 B2
(45) Date of Patent: Jul. 4, 2017

(54) THERMOPLASTIC ELASTOMER COMPOSITION AND COMPOSITE MOLDED BODY

(75) Inventors: Kohsuke Ohtani, Ichihara (JP); Yasuhito Ijichi, Sodegaura (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 311 days.

(21) Appl. No.: 12/669,168

(22) PCT Filed: Jul. 16, 2008

(86) PCT No.: PCT/JP2008/063220
§ 371 (c)(1),
(2), (4) Date: Apr. 13, 2010

(87) PCT Pub. No.: WO2009/011448
PCT Pub. Date: Jan. 22, 2009

(65) Prior Publication Data
US 2010/0207365 A1    Aug. 19, 2010

(30) Foreign Application Priority Data

Jul. 18, 2007 (JP) ................................. 2007-186711
Jul. 18, 2007 (JP) ................................. 2007-186712

(51) Int. Cl.
| | |
|---|---|
| B29C 65/00 | (2006.01) |
| B29C 45/00 | (2006.01) |
| B29C 65/04 | (2006.01) |
| B29C 65/06 | (2006.01) |
| C08L 23/10 | (2006.01) |
| C08L 23/14 | (2006.01) |
| C08L 23/16 | (2006.01) |
| B29C 65/82 | (2006.01) |
| B29K 21/00 | (2006.01) |
| B29K 23/00 | (2006.01) |
| B29K 101/12 | (2006.01) |
| B29L 31/30 | (2006.01) |
| C08L 23/08 | (2006.01) |

(52) U.S. Cl.
CPC .......... *B29C 45/0001* (2013.01); *B29C 65/04* (2013.01); *B29C 65/06* (2013.01); *B29C 65/8215* (2013.01); *B29C 66/112* (2013.01); *B29C 66/114* (2013.01); *B29C 66/43441* (2013.01); *B29C 66/71* (2013.01); *B29C 66/73921* (2013.01); *C08L 23/10* (2013.01); *C08L 23/142* (2013.01); *C08L 23/16* (2013.01); *B29C 65/8207* (2013.01); *B29C 65/8223* (2013.01); *B29C 65/8238* (2013.01); *B29C 66/7315* (2013.01); *B29C 2793/009* (2013.01); *B29K 2021/00* (2013.01); *B29K 2021/003* (2013.01); *B29K 2023/0625* (2013.01); *B29K 2023/12* (2013.01); *B29K 2101/12* (2013.01); *B29K 2995/0089* (2013.01); *B29L 2031/3005* (2013.01); *B29L 2031/3038* (2013.01); *C08L 23/0815* (2013.01); *C08L 2205/02* (2013.01); *C08L 2205/03* (2013.01); *C08L 2205/035* (2013.01); *Y10T 428/17* (2015.01)

(58) Field of Classification Search
CPC ........ C08L 23/10; C08L 23/142; C08L 23/16; B29C 45/0001
USPC .................. 428/515, 516; 525/240
See application file for complete search history.

(56) References Cited

U.S. PATENT DOCUMENTS

| | | | | |
|---|---|---|---|---|
| 5,132,363 A | * | 7/1992 | Furuta et al. | 525/68 |
| 5,218,052 A | * | 6/1993 | Cohen et al. | 525/240 |
| 6,383,654 B1 | * | 5/2002 | Yabe et al. | 428/515 |
| 6,827,997 B2 | * | 12/2004 | Sakurai et al. | 428/40.1 |
| 2002/0119268 A1 | * | 8/2002 | Gakuji et al. | 428/35.7 |
| 2003/0184058 A1 | * | 10/2003 | Gray et al. | 280/728.3 |

FOREIGN PATENT DOCUMENTS

| | | | |
|---|---|---|---|
| JP | 6-192506 A | | 7/1994 |
| JP | 8-027331 A | | 1/1996 |
| JP | 10-265628 A | | 10/1998 |
| JP | 10-273001 A | | 10/1998 |
| JP | 10-306195 A | | 11/1998 |
| JP | 2000-185617 A | | 7/2000 |
| JP | 2001-279037 A | | 10/2001 |

(Continued)

OTHER PUBLICATIONS

ENGAGE 8100 flyer, 2008.*

(Continued)

*Primary Examiner* — Irina Krylova
(74) *Attorney, Agent, or Firm* — Sughrue Mion, PLLC

(57) ABSTRACT

Disclosed are a thermoplastic elastomer composition and a composite molded body. Specifically disclosed is a thermoplastic elastomer composition containing the following component (A1), component (B1) and component (C1). Component (A1): 70-90% by weight of a propylene polymer unit ($\alpha 1$) obtained in a first step by polymerizing a monomer mainly composed of propylene, and an ethylene copolymer unit obtained in a second step by copolymerizing ethylene with propylene and/or an $\alpha$-olefin having 4 or more carbon atoms Component (B1): an ethylene-propylene copolymer rubber having a Mooney viscosity ($ML_{1+4}$, 125° C.) of 20-100 and a weight ratio between the monomer unit derived from ethylene and the monomer unit derived from propylene of from 30/70 to 75/25 Component (C1): an ethylene copolymer as a copolymer of ethylene and an $\alpha$-olefin having 4 or more carbon atoms.

2 Claims, 3 Drawing Sheets

(56) References Cited

FOREIGN PATENT DOCUMENTS

| JP | 2004-058963 A | 2/2004 |
| JP | 2004-098734 A | 4/2004 |
| JP | 2004168112 A | 6/2004 |
| JP | 2006-257330 A | 9/2006 |
| JP | 2006257330 | * 9/2006 |
| JP | 2007-254690 A | 10/2007 |

OTHER PUBLICATIONS

ENGAGE ENR 8556 flyer, 1995.*
Japanese Patent Office, "Notice of Reasons for Rejection," issued in connection with Japanese Patent Application No. P2008-185776, dated Sep. 25, 2012.
Intellectual Property India, "First Examination Report," issued in connection with Indian Patent Application No. 861/CHENP/2010, dated Feb. 13, 2015.
Communication dated Oct. 15, 2015, issued by Intellectual Property India in counterpart Indian Application No. 861/CHENP/2010.
"ENGAGE 8100 Polyolefin Elastomer", Technical Information, DOW, May 17, 2011, 10 pages total.
Communication dated Nov. 3, 2016 from Intellectual Property India in counterpart Indian Application No. 861/CHENP/2010.

* cited by examiner

THERMOPLASTIC ELASTOMER COMPOSITION AND COMPOSITE MOLDED BODY

CROSS REFERENCE TO RELATED APPLICATIONS

This application is a National Stage of International Application No. PCT/JP2008/063220 filed Jul. 16, 2008, claiming priority based on Japanese Patent Application Nos. 2007-186711 and 2007-186712, both filed Jul. 18, 2007, the contents of all of which are incorporated herein by reference in their entirety.

TECHNICAL FIELD

The present invention relates to a thermoplastic elastomer composition and an airbag cover molded body produced by injection molding the thermoplastic elastomer. In addition, the present invention relates to a composite molded body in which a molded body comprised of a polypropylene resin and a molded body comprised of a thermoplastic elastomer composition are joined together by vibration welding.

BACKGROUND ART

An airbag cover of an airbag system for an automobile is demanded to have appropriate stiffness, securely burst in case of collision so that the airbag inflates and prevent broken pieces from scattering, have strength to allow its use even in cold regions and have heat resistance. As the material used for the airbag cover, there are proposed, for example, a composition containing a random polypropylene, a low density polyethylene and an ethylene copolymer rubber or a material comprised of a composition containing an olefin resin and an olefin rubber (Japanese Patent Laid-Open No. 8-27331, Japanese Patent Laid-Open No. 10-273001 and Japanese Patent Laid-Open No. 10-265628). Conventionally, an airbag cover has been formed by injection molding using such a material.

In addition, in some cases, an airbag apparatus for a front passenger seat is mounted on an instrument panel which is an interior part of an automobile. The airbag apparatus is comprised of an airbag which expands when the automobile collides with something and absorbs the impact to the human body, an inflator (gas generator) for expanding the airbag, an airbag cover for accommodating the airbag and the like. Generally, since the instrument panel is required to have heat resistance, it is comprised of a material composed mainly of a polypropylene resin. On the other hand, the airbag cover is required to have excellent mechanical properties such as low-temperature impact resistance, shape retention properties and workability when modularizing with other airbag parts, and as a material satisfying the required performance, an olefin thermoplastic elastomer composition is used (Japanese Patent Laid-Open No. 7-53828 and Japanese Patent Laid-Open No. 8-27331). As a method for integrating the instrument panel and the airbag cover, there is known a method for joining the back side (inside) of the instrument panel and the airbag cover by vibration welding (Japanese Patent Laid-Open No. 2004-98734 and Japanese Patent Laid-Open No. 2004-231027).

DISCLOSURE OF THE INVENTION

It is a first object of the present invention to provide a thermoplastic elastomer composition which has required properties such as melt flowability during injection molding, mold releasability when a molded body is released from a mold, low-temperature resistance of an airbag cover molded body obtained by injection molding and weld physical properties in a balanced manner, and an airbag cover molded body comprised of the elastomer composition.

It is a second object of the present invention to provide a composite molded body in which a molded body comprised of a thermoplastic elastomer composition excellent in mechanical properties such as low-temperature impact resistance, shape retention properties and workability when modularizing with other airbag parts and a molded body comprised of a polypropylene resin are firmly joined and integrated together by vibration welding.

As a result of earnest studies to achieve the above objects, the present inventors have completed the present invention. That is, the present invention provides a thermoplastic elastomer composition containing the following components (A1), (B1) and (C1), wherein the content of the component (A1) is 30 to 55% by weight and the weight ratio (the content of the component (B1)/the content of the component (C1)) of the content of the component (B1) to the content of the component (C1) is 0.25 to 5.0, based on 100% by weight of the total amount of the components (A1), (B1) and (C1).

Component (A1): a propylene polymer comprised of 70 to 90% by weight of a propylene polymer unit ($\alpha$1) obtained in a first step by polymerizing a monomer composed mainly of propylene and 10 to 30% by weight of an ethylene copolymer unit ($\beta$1) obtained in a second step by copolymerizing ethylene with propylene and/or an $\alpha$-olefin having 4 or more carbon atoms, wherein the content of the monomer unit derived from ethylene is 20 to 80% by weight, provided that the amount of the ethylene copolymer unit is 100% by weight and a 20° C. xylene soluble portion (CXS portion) has an intrinsic viscosity $[\eta]$ of 2.5 to 8.0 as measured in tetralin at 135° C. (provided that the content of the propylene polymer unit ($\alpha$1) and the ethylene copolymer unit ($\beta$1) is a value based on 100% by weight of the total amount of the component (A1)).

Component (B1): an ethylene-propylene copolymer rubber having a Mooney viscosity ($ML_{1+4}$, 125° C.) of 20 to 100 and a weight ratio of the monomer unit derived from ethylene to the monomer unit derived from propylene of from 30/70 to 75/25 (provided that the total of the monomer unit derived from ethylene and the monomer unit derived from propylene in the component (B1) is 100).

Component (C1): an ethylene copolymer of ethylene and an $\alpha$-olefin having 4 or more carbon atoms, wherein the density is 0.860 to 0.910 g/cm$^3$ and the melt flow rate is 0.01 to 10 g/10 min as measured at 190° C. under a load of 21.18 N.

The present invention provides an airbag cover molded body obtained by injection molding the thermoplastic elastomer composition.

Further, the present invention provides a composite molded body in which a molded body comprised of a polypropylene resin (A2) and a molded body comprised of a thermoplastic elastomer composition (B2), which satisfy the following requirements, are joined together by vibration welding.

(A2): a polypropylene resin having a flexural modulus of 1000 MPa or more and a melting peak temperature of 160° C. or more, as measured by a differential scanning calorimeter.

(B2): a thermoplastic elastomer composition containing a polypropylene polymer (component (b1)) having a melting peak temperature 10° C. or less lower than that of the polypropylene resin (A2) and an ethylene-propylene copolymer rubber (component (b2)) having a weight ratio of the monomer unit derived from ethylene to the monomer unit derived from propylene of from 30/70 to 75/25 (provided that the total of the monomer unit derived from ethylene and the monomer unit derived from propylene in the component (b2) is 100) and having a flexural modulus of 150 to 800 MPa.

REFERENCE SIGNS LIST

Figure 1:
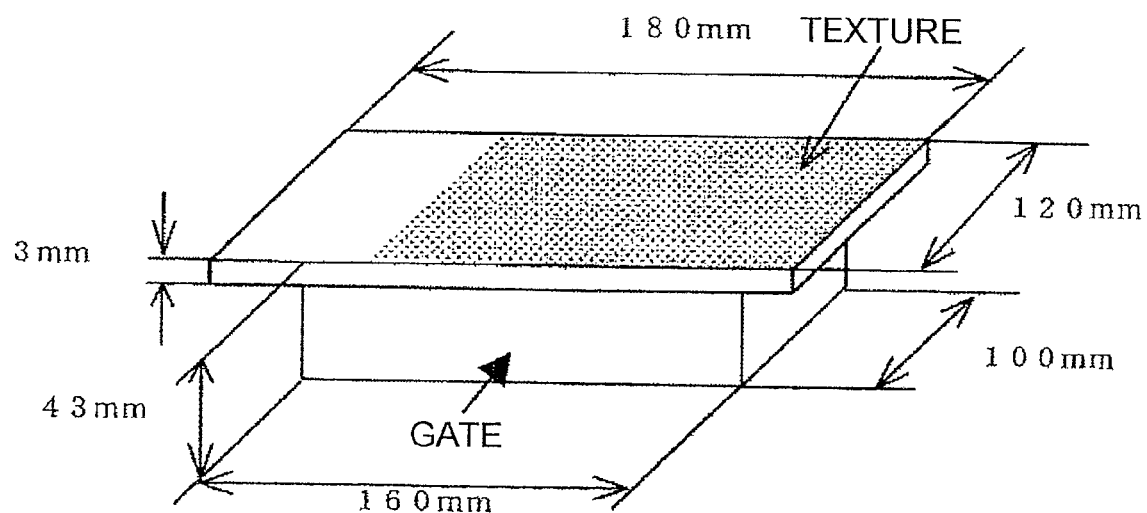
FIG. 1 is a schematic view of a molded body used for the evaluation of mold releasing properties.
Figure 2:
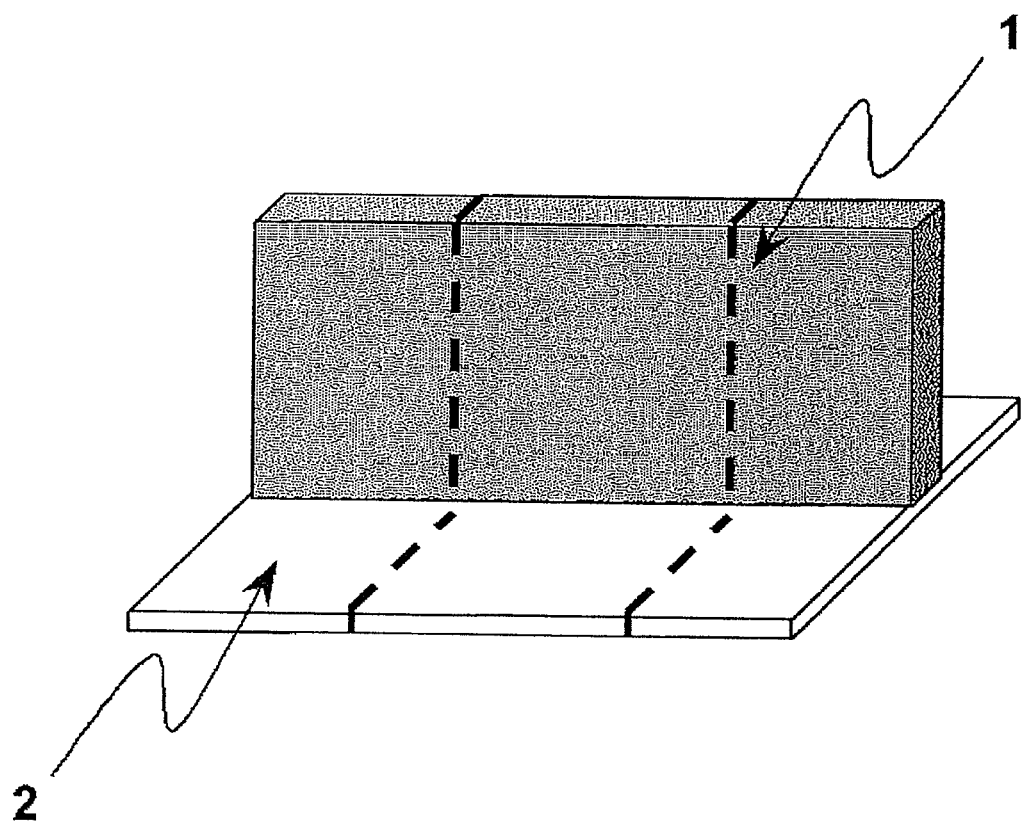
FIG. 2 is a schematic view of a composite molded body obtained by Examples.
Figure 3:
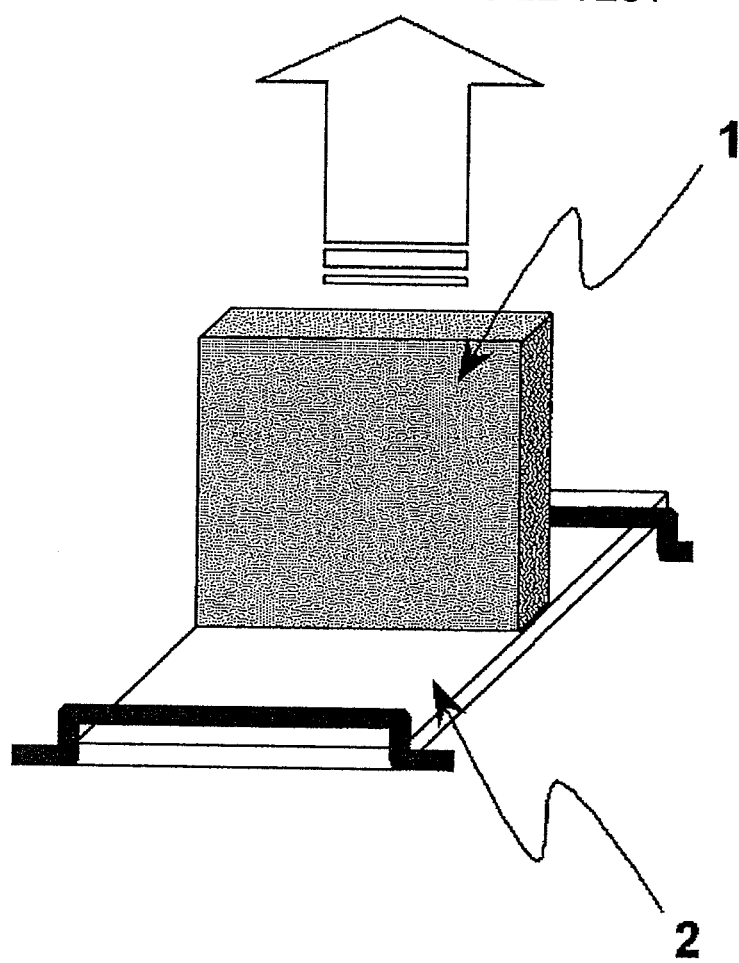
FIG. 3 is a schematic view of a composite molded body used for the evaluation of joint strength.

1 An injection molded body comprised of a thermoplastic elastomer composition (B2)
2 An injection molded body comprised of a polypropylene resin (A2)

BEST MODES FOR CARRYING OUT THE INVENTION

Thermoplastic Elastomer Composition

The thermoplastic elastomer composition of the present invention contains a component (A1), a component (B1) and a component (C1), which are described later. The component (A1) is a propylene polymer comprised of 70 to 90% by weight of a propylene polymer unit ($\alpha$1) obtained in a first step by polymerizing a monomer composed mainly of propylene and 10 to 30% by weight of an ethylene copolymer unit ($\beta$1) obtained in a second step by copolymerizing ethylene with propylene and/or an $\alpha$-olefin having 4 or more carbon atoms, wherein the content of the monomer unit derived from ethylene is 20 to 80% by weight, provided that the amount of the ethylene copolymer unit is 100% by weight and a 20° C. xylene soluble portion (CXS portion) has an intrinsic viscosity [$\eta$] of 2.5 to 8.0 as measured in tetralin at 135° C. (provided that the content of the propylene polymer unit ($\alpha$1) and the ethylene copolymer unit ($\beta$1) is a value based on 100% by weight of the total amount of the component (A1)).

The propylene polymer of the component (A1) is comprised of 70 to 90% by weight of the propylene polymer unit ($\alpha$1) and 10 to 30% by weight of the ethylene copolymer unit ($\beta$1) and preferably comprised of 75 to 85% by weight of the propylene polymer unit ($\alpha$1) and 15 to 25% by weight of the ethylene copolymer unit ($\beta$1) (provided that the total amount of the component (A1) is 100% by weight). If the content of the ethylene copolymer unit ($\beta$1) contained in the propylene polymer of the component (A1) is too large, the thermoplastic elastomer composition tends to be inferior in melt flowability, and if the content of the ethylene copolymer unit ($\beta$1) is too small, a resulting airbag cover molded body tends to be inferior in low-temperature impact resistance.

In the ethylene copolymer unit ($\beta$1) which is contained in the propylene polymer of the component (A1) and is obtained by copolymerizing ethylene and propylene and/or an $\alpha$-olefin having 4 or more carbon atoms, the content of the monomer unit derived from ethylene is 20 to 80% by weight, more preferably 30 to 70% by weight and still more preferably 35 to 60% by weight, provided that the amount of the ethylene copolymer unit is 100% by weight. If the content of the monomer unit derived from ethylene is too small or too large, a resulting airbag cover molded body tends to be inferior in low-temperature impact resistance.

In the propylene polymer of the component (A1), a 20° C. xylene soluble portion (CXS portion) has an intrinsic viscosity [$\eta$] of 2.5 to 8.0 and preferably of 3.0 to 7.5, as measured in tetralin at 135° C. If the intrinsic viscosity [$\eta$] is too low, a resulting airbag cover molded body tends to be inferior in weld physical properties, and if the intrinsic viscosity [$\eta$] is too high, a resulting thermoplastic elastomer composition tends to be inferior in melt flowability. Here, the 20° C. xylene soluble portion (CXS portion) is a portion obtained by the following method. A solution is prepared by completely dissolving 5 g of the propylene polymer in 500 ml of boiling xylene and then the solution is heated to 20° C., followed by allowing it to stand for 4 hours or more. Thereafter, the resulting solution is filtered to obtain a precipitate and a filtrate. The filtrate is evaporated to dryness and dried under reduced pressure at 70° C. to obtain the xylene soluble portion. A reduced viscosity is measured using an Ubbelohde type viscometer and then the intrinsic viscosity [$\eta$] is determined by extrapolation of the reduced viscosity using the calculation method described in "Kobunshi Yoeki, Kobunshi Jikkengaku 11" (Polymer Solution, Polymer Experiment 11) (published by Kyoritsu Shuppan Co., Ltd. in 1982), page 491.

As a method for producing the propylene polymer of the component (A1), there is employed a known polymerization method using a known olefin polymerization catalyst. For example, examples of the polymerization method include a slurry polymerization method, a solution polymerization method, a bulk polymerization method, and a gas-phase polymerization method using a Ziegler-Natta catalyst, or a complex catalyst such as a metallocene complex and a non-metallocene complex. In addition, commercially available equivalent products can also be used.

The ethylene-propylene copolymer rubber of the component (B1) contained in the thermoplastic elastomer composition of the present invention is an ethylene-propylene copolymer rubber having a weight ratio of the monomer unit derived from ethylene to the monomer unit derived from propylene of from 30/70 to 75/25 and preferably 35/65 to 70/30 (provided that the total of the monomer unit derived from ethylene and the monomer unit derived from propylene in the component (B1) is 100). If the ratio of the monomer unit derived from ethylene to the monomer unit derived from propylene in the component (B1) exceeds the above range, an airbag cover obtained by injection molding the thermoplastic elastomer composition containing the component (B1) tends to be inferior in low-temperature impact resistance.

The ethylene-propylene copolymer rubber of the component (B1) has a Mooney viscosity ($ML_{1+4}$, 125° C.) measured at 125° C. of 20 to 100 and preferably 40 to 80. If the Mooney viscosity is too low, a resulting airbag cover molded body may be inferior in mold releasability and low-temperature impact resistance, and if the Mooney viscosity is too high, a resulting thermoplastic elastomer composition may be inferior in melt flowability. The Mooney viscosity is measured according to ASTM D-1646.

The component (B1) may contain the monomer unit derived from ethylene and the monomer unit derived from non-conjugated diene, in addition to the monomer unit derived from propylene. Examples of the non-conjugated diene include a chain non-conjugated diene such as 1,4-hexadiene, 1,6-octadiene, 2-methyl-1,5-hexadiene, 6-methyl-1,5-heptadiene and 7-methyl-1,6-octadiene; a cyclic nonconjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and a triene such as 2,3-diisopropylidene-5-norbornene, 2-ethylidene-3-isopropylidene-5-norbornene, 2-propenyl-2,2-norbornadiene, 1,3,7-octatriene and 1,4,9-decatriene, and preferred are 5-ethylidene-2-norbornene and dicyclopentadiene. When the component (B1) is an ethylene-propylene-non-conjugated diene copolymer rubber, the amount of the monomer unit derived from non-conjugated diene contained in the component (B1) is preferably 10% by weight or less and more preferably 5% by weight or less, from the viewpoint of durability of an airbag cover obtained by using a composition containing the rubber.

An ethylene copolymer, which is a copolymer of ethylene in the component (C1) contained in the thermoplastic elastomer composition of the present invention and an α-olefin having 4 or more carbon atoms, has a density of 0.860 to 0.910 g/cm$^3$, preferably 0.865 to 0.905 g/cm$^3$ and more preferably 0.865 to 0.900 g/cm$^3$. If the density is lower than 0.860 g/cm$^3$, an airbag cover molded body obtained by using the thermoplastic elastomer composition containing the component (C1) tends to be inferior in weld physical properties, and if the density is higher than 0.910 g/cm$^3$, an airbag cover molded body obtained by using the thermoplastic elastomer composition containing the component (C1) tends to be inferior in low-temperature impact resistance. The density of the component (C1) is measured without annealing according to JIS K7112.

The ethylene copolymer, which is the component (C1), has a melt flow rate (hereinafter referred to as an MFR) of 0.01 to 10 g/10 min and preferably of 0.5 to 8 g/10 min, as measured at 190° C. under a load of 21.18 N. If the MFR is too low, a resulting thermoplastic elastomer composition tends to be inferior in melt flowability, and if the MFR is too high, the mold releasability when the thermoplastic elastomer composition containing the component (C1) is injection molded and the weld physical properties of an airbag cover molded body obtained by injection molding tend to be inferior.

As a method for producing the component (B1) and component (C1), there is employed a known polymerization method using a known olefin polymerization catalyst. For example, examples of the polymerization method include a slurry polymerization method, a solution polymerization method, a bulk polymerization method, and a gas-phase polymerization method using a Ziegler-Natta catalyst, or a complex catalyst such as a metallocene complex and a non-metallocene complex. In addition, commercially available equivalent products can also be used.

The thermoplastic elastomer composition of the present invention contains the components (A1), (B1) and (C1), and the ratio is 30 to 55% by weight and preferably 35 to 53% by weight of the component (A1), based on 100% by weight of the total amount of the thermoplastic elastomer composition. If the content of the component (A1) is too small, a resulting thermoplastic elastomer composition tends to be inferior in melt flowability, and if the content of the component (A1) is too large, an airbag cover molded body obtained by using the composition tends to be inferior in low-temperature impact resistance.

In the amount of the components (B1) and (C1) contained in the thermoplastic elastomer composition, the weight ratio of the content of the component (B1) to the content of the component (C1) is 0.25 to 5.0. If the content of the component (B1) is too small, a molded body obtained by injection molding the thermoplastic elastomer composition may be inferior in mold releasability, and if the content of the component (B1) is too large, a resulting molded body may be inferior in weld physical properties.

When the thermoplastic elastomer composition of the present invention is used for injection molding, the following component (D1) is preferably incorporated, in addition to the components (A1), (B1) and (C1), from the viewpoint of improving mold releasability.

Component (D1): at least one compound selected from the compound group consisting of a fatty acid having 5 or more carbon atoms, a fatty acid metal salt having 5 or more carbon atoms, a fatty acid amide having 5 or more carbon atoms and a fatty acid ester having 5 or more carbon atoms.

Examples of the fatty acid having 5 or more carbon atoms of the component (D1) include lauric acid, palmitic acid, stearic acid, behenic acid, oleic acid, erucic acid, linoleic acid and ricinoleic acid.

Examples of the fatty acid metal salt having 5 or more carbon atoms of the component (D1) include a salt of the above fatty acids and a metal such as Li, Na, Mg, Al, K, Ca, Zn, Ba and Pb, and specifically include lithium stearate, sodium stearate, calcium stearate and zinc stearate.

Examples of fatty acid amide having 5 or more carbon atoms of the component (D1) include lauric acid amide, palmitic acid amide, stearic acid amide, oleic acid amide, erucic acid amide, methylene-bis-stearic acid amide, ethylene-bis-stearic acid amide, ethylene-bis-oleic acid amide and stearyl diethanolamide. Among these, erucic acid amide is preferable.

Examples of fatty acid ester having 5 or more carbon atoms of the component (D1) include an alcohol such as an aliphatic alcohol (myristyl alcohol, palmityl alcohol, stearyl alcohol, behenyl alcohol, 12-hydroxystearyl alcohol and the like), an aromatic alcohol (benzyl alcohol, β-phenylethyl alcohol, phthalyl alcohol and the like) and a polyhydric alcohol (glycerin, diglycerin, polyglycerin, sorbitan, sorbitol, propylene glycol, polypropylene glycol, polyethylene glycol, pentaerythritol, trimethylolpropane and the like); and an ester with the above fatty acids, and specifically include glycerin monooleate, glycerin dioleate, polyethylene glycol monostearate and citric acid distearate.

When the thermoplastic elastomer composition of the present invention contains the component (D1), the content of the component (D1) is preferably 0.01 to 1.5 parts by weight and more preferably 0.05 to 1 parts by weight based on a total of 100 parts by weight of the components (A1), (B1) and (C1), from the viewpoint of the balance between the mold releasability during injection molding and the appearance of the molded body surface obtained by injection molding.

The thermoplastic elastomer composition of the present invention may contain an inorganic filler (such as talc, calcium carbonate and sintered kaolin), an organic filler (such as fibrics, wood powders, cellulose powders), a lubricant (such as silicone oil and silicone rubber), an antioxidant (such as a phenol-based antioxidant, a sulfur-based antioxidant, a phosphorus-based antioxidant, a lactone-based antioxidant and a vitamin-based antioxidant), a weathering stabilizer, an ultraviolet absorber (such as a benzotriazole-based ultraviolet absorber, a triazine-based ultraviolet absorber, an anilide-based ultraviolet absorber and a benzophenone-based ultraviolet absorber), a heat stabilizer, a light stabilizer (such as a hindered amine-based light stabilizer and a benzoate-based light stabilizer), a pigment, a nucleating agent, an adsorbent (such as a metal oxide (such as zinc oxide and magnesium oxide), a metal chloride (such as iron chloride and calcium chloride), hydrotalcite and an aluminate), and the like, when needed.

The thermoplastic elastomer composition of the present invention can be obtained by melt-kneading the components (A1), (B1) and (C1), as well as other components if needed by a known method, for example, a biaxial extruder and a Banbury mixer.

The above thermoplastic elastomer composition can be formed into a desired molded body by a known molding method, preferably an injection molding method.

The thermoplastic elastomer composition of the present invention is suitable as a material for producing an airbag cover molded body by injection molding. The airbag cover comprised of the thermoplastic elastomer composition of the present invention is used as an airbag cover for a driver's seat, an airbag cover for a passenger's seat, a side airbag cover, a knee airbag cover and a curtain airbag cover. Especially, when the thermoplastic elastomer composition is used for the production of an airbag cover molded body in which a hoop rib thickness (T1) is 1.5 to 5 mm, the ratio (T1/T2) of (T1) to a top panel thickness (T2) is 0.5 to 1.1 and the opening area per opening section of the hoop rib is 7 cm$^2$ or less, there is obtained an airbag cover molded body having an extremely good appearance and excellent weld physical properties.

From the viewpoint of the weld physical properties and appearance of a molded body, the hoop rib thickness (T1) of the molded body is preferably 1.5 to 5 mm and more preferably 1.8 to 4.8 mm.

From the viewpoint of the appearance and shape retention properties of a molded body, the ratio (T1/T2) of the hoop rib thickness (T1) of the molded body to the top panel thickness (T2) is preferably 0.5 to 1.1 and more preferably 0.6 to 1.0. Especially if the ratio is too large, sink tends to readily occur in a resulting molded body.

From the viewpoint of the weld physical properties of a molded body, the opening area per opening section of the hoop rib of the molded body is preferably 7 cm$^2$ or less and more preferably 6 cm$^2$ or less.

Composite Molded Body

The composite molded body of the present invention is a composite molded body in which a molded body comprised of a polypropylene resin (A2) and a molded body comprised of a thermoplastic elastomer composition (B2) are joined together by vibration welding.

The polypropylene resin (A2) in the present invention has a flexural modulus of 1000 MPa or more and preferably 1500 MPa or more. If the flexural modulus is too low, a resulting composite molded body may tend to be deformed. In addition, the flexural modulus is a value measured by JIS-K-7171.

From the viewpoint of heat resistance, the polypropylene resin (A2) has a melting peak temperature of 160° C. or more and preferably 163° C. or more, as measured by a differential scanning calorimeter. Here, the melting peak temperature is a value measured for a polypropylene resin used as a raw material by JIS-K-7121. Specifically, the polypropylene resin is heated from room temperature to 220° C. at a heating rate of 10° C./min and then cooled to −90° C. at a cooling rate of 5° C./min with no holding time. The resin is heated again from −90° C. to 200° C. at a heating rate of 10° C./min with no holding time. A value measured at the second heating operation is determined as the melting peak temperature. When a plurality of melting peaks is obtained, a peak value at the highest temperature side is taken.

The polypropylene resin (A2) in the present invention may contain an inorganic filler (such as talc, calcium carbonate and sintered kaolin), an organic filler (such as fabrics, wood powders, cellulose powders), a lubricant (such as silicone oil and silicone rubber), an antioxidant (such as a phenol-based antioxidant, a sulfur-based antioxidant, a phosphorus-based antioxidant, a lactone-based antioxidant and a vitamin-based antioxidant), a weathering stabilizer, an ultraviolet absorber (such as a benzotriazole-based ultraviolet absorber, a triazine-based ultraviolet absorber, an anilide-based ultraviolet absorber and a benzophenone-based ultraviolet absorber), a heat stabilizer, a light stabilizer (such as a hindered amine-based light stabilizer and a benzoate-based light stabilizer), a pigment, a nucleating agent, an adsorbent (such as a metal oxide (such as zinc oxide and magnesium oxide), a metal chloride (such as iron chloride and calcium chloride), hydrotalcite and an aluminate), and the like, when needed.

The thermoplastic elastomer composition (B2) in the present invention is a thermoplastic elastomer composition containing a polypropylene polymer (component (b1)) having a melting peak temperature 10° C. or less lower than that of the polypropylene resin (A2) and an ethylene-propylene copolymer rubber (component (b2)) having a weight ratio of the monomer unit derived from ethylene to the monomer unit derived from propylene of from 30/70 to 75/25 (provided that the total of the monomer unit derived from ethylene and the monomer unit derived from propylene in the component (b2) is 100) and having a flexural modulus of 150 to 800 MPa.

The component (b1) contained in the thermoplastic elastomer composition (B2) is a polypropylene polymer having a melting peak temperature 10° C. or less and preferably 7° C. or less lower than that of the polypropylene resin (A2). The present invention has found that the molded body comprised of the polypropylene resin (A2) and the molded body comprised of the thermoplastic elastomer composition (B2) can be firmly joined together by vibration welding by adjusting the difference between the melting peak temperature of the polypropylene resin (A2) comprising one molded body to be vibration welded and the melting peak temperature of the component (b1) contained in the thermoplastic elastomer composition (B2) comprising another molded body at a given level or lower. In addition, the melting peak temperature of the component (b1) is a value measured for the component (b1) used as a raw material by JIS-K-7121. Specifically, the polypropylene resin is heated from room temperature to 220° C. at a heating rate of 10° C./min and then cooled to −90° C. at a cooling rate of 5° C./min with no holding time. The resin is heated again from −90° C. to 200° C. at a heating rate of 10° C./min with no holding time. A value measured at the second heating operation is determined as the melting peak temperature. When a plurality of melting peaks is obtained, a peak value at the highest temperature side is taken.

The polypropylene polymer, which is the component (b1) contained in the thermoplastic elastomer composition (B2), is preferably a polypropylene polymer comprised of 70 to 90% by weight of the following propylene polymer unit (α2) and 10 to 30% by weight of the following ethylene copolymer unit (β2) (provided that the total amount of the component (b1) is 100% by weight).

(α2): a propylene polymer unit obtained by polymerizing a monomer composed mainly of propylene in the first step.

(β2): an ethylene copolymer unit obtained by copolymerizing ethylene with propylene and/or an α-olefin having 4 or more carbon atoms in the second step, wherein the content of the monomer unit derived from ethylene is 20 to 80% by weight, provided that the amount of the ethylene copolymer unit is 100% by weight.

In the ethylene copolymer unit (β2) which is contained in the polypropylene polymer of the component (b1) and is obtained by copolymerizing ethylene with propylene and/or an α-olefin having 4 or more carbon atoms, the content of the monomer unit derived from ethylene is preferably 20 to 80% by weight and more preferably 30 to 70% by weight, provided that the amount of the ethylene copolymer is 100% by weight. A molded body excellent in low-temperature impact resistance can be obtained by using the thermoplastic elastomer composition (B2) containing the component (b1).

The polypropylene polymer of the component (b1) is preferably comprised of 70 to 90% by weight of the propylene polymer unit (α2) and 10 to 30% by weight of the ethylene copolymer unit (β2), and is more preferably comprised of 75 to 85% by weight of the propylene polymer unit (α2) and 15 to 25% by weight of the ethylene copolymer unit (β2) (provided that the total amount of the component (b1) is 100% by weight).

If the content of the ethylene copolymer unit (β2) contained in the polypropylene polymer (b1) is too large, a resulting thermoplastic elastomer composition may be inferior in melt flowability and heat resistance, and if the content of (β2) is too small, a molded body comprised of the resulting thermoplastic elastomer composition may be inferior in low-temperature impact resistance.

In the polypropylene polymer which is the component (b1), a 20° C. xylene soluble portion (CXS portion) has an intrinsic viscosity [η] of preferably 2.5 to 8.0, more preferably 3.0 to 7.5 and still more preferably 3.5 to 7.0, as measured in tetralin at 135° C. If the intrinsic viscosity [η] is 2.5 or more, a composite molded body, which is more excellent in joint strength after vibration welding, can be obtained by using a polypropylene polymer containing the CXS portion as the component (b1). On the other hand, a composition excellent in melt flowability is obtained by using a polypropylene polymer containing the CXS portion having an intrinsic viscosity [η] of 8.0 or less as the component (b1). Here, the 20° C. xylene soluble portion (CXS portion) is a portion obtained by the following method. A solution is prepared by completely dissolving 5 g of the polypropylene polymer in 500 ml of boiling xylene and then the solution is heated to 20° C., followed by allowing it to stand for 4 hours or more. Thereafter, the resulting solution is filtered to obtain a precipitate and a filtrate. The filtrate is evaporated to dryness and dried under reduced pressure at 70° C. to obtain the xylene soluble portion. A reduced viscosity is measured using an Ubbelohde type viscometer, and then the intrinsic viscosity [η] is determined by extrapolation of the reduced viscosity using the calculation method described in "Kobunshi Yoeki, Kobunshi Jikkengaku 11" (Polymer Solution, Polymer Experiment 11) (published by Kyoritsu Shuppan Co., Ltd. in 1982), page 491.

As a method for producing the polypropylene polymer of the component (b1), there is employed a known polymerization method using a known olefin polymerization catalyst. For example, examples of the polymerization method include a slurry polymerization method, a solution polymerization method, a bulk polymerization method, and a gas-phase polymerization method using a Ziegler-Natta catalyst, or a complex catalyst such as a metallocene complex and a non-metallocene complex. In addition, commercially available equivalent products can also be used.

The component (b2) contained in the thermoplastic elastomer composition (B2) is an ethylene-propylene copolymer rubber having a weight ratio of the monomer unit derived from ethylene to the monomer unit derived from propylene of from 30/70 to 75/25 and preferably of from 35/65 to 70/30 (provided that the total of the monomer unit derived from ethylene and the monomer unit derived from propylene in the component (b2) is 100). If the ratio of the monomer unit derived from ethylene to the monomer unit derived from propylene contained in the component (b2) exceeds the above range, a molded body comprised of the thermoplastic elastomer composition (B2) containing the component (b2) may be inferior in low-temperature impact resistance.

The ethylene-propylene copolymer rubber, which is the component (b2), has a Mooney viscosity ($ML_{1+4}$, 125° C.) measured at 125° C. of preferably 20 to 100 and more preferably 40 to 80. If the component (b2) has a Mooney viscosity of 20 or more, a molded body obtained by forming the thermoplastic elastomer composition (B2) containing the component (b2) is improved in low-temperature impact resistance. In addition, when a molded body is produced by injection molding the composition (B2), the molded body is also excellent in mold releasability. If the component (b2) has a Mooney viscosity of 100 or less, the thermoplastic elastomer composition (B2) containing the component (b2) is improved in melt flowability. The Mooney viscosity is measured according to ASTM D-1646.

The component (b2) may be copolymerized with a non-conjugated diene other than ethylene and propylene.

Examples of the non-conjugated diene include a chain non-conjugated diene such as 1,4-hexadiene, 1,6-octadiene, 2-methyl-1,5-hexadiene, 6-methyl-1,5-heptadiene and 7-methyl-1,6-octadiene; a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and a triene such as 2,3-diisopropylidene-5-norbornene, 2-ethylidene-3-isopropylidene-5-norbornene, 2-propenyl-2,2-norbornadiene, 1,3,7-octatriene and 1,4,9-decatoriene, and preferred are 5-ethylidene-2-norbornene and dicyclopentadiene. When the component (b2) is an ethylene-propylene-non-conjugated diene copolymer rubber, the content of the monomer unit derived from non-conjugated diene contained in 100% by weight of the copolymer rubber is preferably 10% by weight or less and more preferably 5% by weight or less, from the viewpoint of durability of a resulting molded body.

The thermoplastic elastomer composition (B2) in the present invention preferably contains 100 parts by weight of the component (b1) and 50 to 300 parts by weight of the component (b2) per 100 parts by weight of the component (b1).

The thermoplastic elastomer composition (B2) in the present invention preferably further contains, as a component (b3), an ethylene copolymer which is a copolymer of ethylene and α-olefin having 4 or more carbon atoms, in addition to the components (b1) and (b2), wherein the density is 0.860 to 0.910 g/cm$^3$, and the melt flow rate is 0.01 to 10 g/10 min, as measured at 190° C. under a load of 21.18 N.

The component (b3) has a density of preferably 0.860 to 0.910 g/cm$^3$ and more preferably of 0.865 to 0.905 g/cm$^3$. If the component (b3) has a density of 0.860 g/cm³ or more, a composite molded body becomes excellent in joint strength. If the component (b3) has a density of 0.910 g/cm³ or less, a molded body comprised of the thermoplastic elastomer composition (B2) becomes more excellent in low-temperature impact resistance. The density is measured without annealing according to JIS K7112.

The component (b3) has a melt flow rate (hereinafter referred to as an MFR) of preferably 0.01 to 10 g/10 min and more preferably of 0.5 to 8 g/10 min, as measured at 190° C. under a load of 21.18 N. A composite molded body becomes more excellent in melt flowability during injection molding by using the thermoplastic elastomer composition (B2) containing the component (b3) having an MFR of 0.01 g/10 min or more. A molded body comprised of the thermoplastic elastomer composition (B2) becomes more excellent in joint strength by using the thermoplastic elastomer composition (B2) containing the component (b3) having an MFR of 10 g/10 min or less.

If the thermoplastic elastomer composition (B2) in the present invention contains the components (b1), (b2) and (b3), the content is preferably 100 parts by weight of the component (b1), 50 to 300 parts by weight of the component (b2) per 100 parts by weight of the component (b1) and 3 to 100 parts by weight of the component (b3). More preferably, the content of the component (b3) is 5 to 90 parts by weight. If the content of the component (b3) is 3 parts by weight or more, a resulting composite molded body becomes more excellent in joint strength. If the content of the component (b3) is 100 parts by weight or less, a resulting molded body obtained by forming the thermoplastic elastomer composition (B2) is further improved in low-temperature impact resistance. In addition, when a molded body is produced by injection molding the composition (B2), the molded body is also excellent in mold releasability.

As a method for producing the components (b2) and (b3), there is employed a known polymerization method using a known olefin polymerization catalyst. For example, examples of the polymerization method include a slurry polymerization method, a solution polymerization method, a bulk polymerization method, and a gas-phase polymerization method using a Ziegler-Natta catalyst, or a complex catalyst such as a metallocene complex and a non-metallocene complex. In addition, commercially available equivalent products can also be used.

The thermoplastic elastomer composition (B2) in the present invention has a flexural modulus of 150 to 800 MPa, preferably 200 to 700 MPa and more preferably 250 to 550 MPa. If the flexural modulus is too low, a molded body comprised of the composition (B2) may be inferior in shape retention properties, and if the flexural modulus is too high, when the molded body comprised of the composition (B2) is used as an airbag cover molded body and is modularized with other airbag parts, the workability may be decreased.

In case of obtaining a molded body by injection molding the thermoplastic elastomer composition (B2) in the present invention, the thermoplastic elastomer composition (B2) preferably further contains, in addition to the components (b1), (b2) and (b3), the following component (b4), from the viewpoint of improving mold releasability.

(b4): at least one compound selected from the compound group consisting of a fatty acid having 5 or more carbon atoms, a fatty acid metal salt having 5 or more carbon atoms, a fatty acid amide having 5 or more carbon atoms and a fatty acid ester having 5 or more carbon atoms.

Examples of the fatty acid having 5 or more carbon atoms of the component (b4) include lauric acid, palmitic acid, stearic acid, behenic acid, oleic acid, erucic acid, linoleic acid and ricinoleic acid.

Examples of the fatty acid metal salt having 5 or more carbon atoms of the component (b4) include a salt of the above fatty acids and a metal such as Li, Na, Mg, Al, K, Ca, Zn, Ba and Pb, and specifically include lithium stearate, sodium stearate, calcium stearate and zinc stearate.

Examples of the fatty acid amide having 5 or more carbon atoms of the component (b4) include lauric acid amide, palmitic acid amide, stearic acid amide, oleic acid amide, erucic acid amide, methylene-bis-stearic acid amide, ethylene-bis-stearic acid amide, ethylene-bis-oleic acid amide and stearyl diethanolamide. Among these, erucic acid amide is preferable.

Examples of fatty acid ester having 5 or more carbon atoms of the component (b4) include an alcohol such as an aliphatic alcohol (myristyl alcohol, palmityl alcohol, stearyl alcohol, behenyl alcohol, 12-hydroxystearyl alcohol and the like), an aromatic alcohol (benzyl alcohol, β-phenylethyl alcohol, phthalyl alcohol and the like) and a polyhydric alcohol (glycerin, diglycerin, polyglycerin, sorbitan, sorbitol, propylene glycol, polypropylene glycol, polyethylene glycol, pentaerythritol, trimethylolpropane and the like); and an ester with the above fatty acids, specifically, glycerin monooleate, glycerin dioleate, polyethylene glycol monostearate and citric acid distearate.

The content of the component (b4) in the thermoplastic elastomer composition (B2) is preferably 0.01 to 1.5 parts by weight and more preferably 0.02 to 1 parts by weight per 100 parts by weight of the component (b1), from the viewpoint of the balance between the mold releasability during injection molding and the appearance of the surface of a resulting molded body.

The thermoplastic elastomer composition (B2) in the present invention may contain an inorganic filler (such as talc, calcium carbonate and sintered kaolin), an organic filler (such as fibrics, wood powders, cellulose powders), a lubricant (such as silicone oil and silicone rubber), an antioxidant (such as a phenol-based antioxidant, a sulfur-based antioxidant, a phosphorus-based antioxidant, a lactone-based antioxidant and a vitamin-based antioxidant), a weathering stabilizer, an ultraviolet absorber (such as a benzotriazole-based ultraviolet absorber, a triazine-based ultraviolet absorber, an anilide-based ultraviolet absorber and a benzophenone-based ultraviolet absorber), a heat stabilizer, a light stabilizer (such as a hindered amine-based light stabilizer and a benzoate-based light stabilizer), a pigment, a nucleating agent, an adsorbent (such as an metal oxide (such as zinc oxide and magnesium oxide), a metal chloride (such as iron chloride and calcium chloride), hydrotalcite and an aluminate), and the like, when needed.

The thermoplastic elastomer composition (B2) in the present invention can be obtained by melt-kneading the components (b1) and (b2), as well as the components (b3) and (b4) and other components if needed by a known method, for example, a biaxial extruder and a Banbury mixer.

In the present invention, a molded body is obtained by forming the thermoplastic elastomer composition (B2) and the polypropylene resin (A2), respectively, by a known method. The production method of the molded body is not particularly limited, but the molded body is preferably produced by injection molding because a molded body having a complicated shape can be efficiently produced.

As the method for vibration welding a molded body comprised of the polypropylene resin (A2) and a molded body comprised of the thermoplastic elastomer composition (B2), the welding is preferably carried out under the condition where the welding depth is 0.1 to 3 mm using an apparatus having a vibration frequency of 50 MHz or more.

The composite molded body of the present invention is suitable as an automobile interior part. Above all, the molded body is suitable as an airbag integrated instrument panel, which is obtained by vibration welding an instrumental panel which is formed as a molded body comprised of the polypropylene resin (A2) and an airbag cover which is formed as a molded body comprised of the thermoplastic elastomer composition (B2).

EXAMPLES

Hereinafter, the present invention will be described in more detail with reference to Examples and Comparative Examples.

Thermoplastic Elastomer Composition

[I] Methods for Measuring Physical Properties (1) Melt Flow Rate (MFR)

The MFR of the component (A1) and a thermoplastic elastomer composition was measured at 230° C. under a load of 2.16 kg, according to JIS K7210. The MFR of the ethylene copolymer (component (C1)) was measured at 190° C. under a load of 2.16 kg.

(2) Measurement Method for Intrinsic Viscosity [η]

A solution was prepared by completely dissolving 5 g of the propylene polymer in 500 ml of boiling xylene and then the solution was cooled to 20° C., followed by allowing it to stand for 4 hours or more. Thereafter, the resulting solution was filtered to obtain a precipitate and a filtrate. The filtrate was evaporated to dryness and dried under reduced pressure at 70° C. to obtain a xylene soluble portion. A reduced viscosity was measured using an Ubbelohde type viscometer and then the intrinsic viscosity [η] was determined by extrapolation of the reduced viscosity using the calculation method described in "Kobunshi Yoeki, Kobunshi Jikkengaku 11" (Polymer Solution, Polymer Experiment 11) (published by Kyoritsu Shuppan Co., Ltd. in 1982), page 491.

(3) Density

The density was measured without annealing according to JIS K7112.

(4) Mooney Viscosity

The Mooney viscosity was measured according to ASTM D-1646.

(5) Content of Monomer Unit Derived from Monomer in Polymer

The composition of the ethylene-propylene copolymer rubber (B1) was determined by an infrared absorption spectrometer (Model FT-IR 5200, manufactured by JASCO Corporation) according to ASTM 3900.

(6) Production Method of Injection Molded Body

The thermoplastic elastomer composition was injection molded under the conditions of a cylinder temperature of 220° C. and a mold temperature of 50° C. using a side gate flat plate mold in an injection molding machine, IS 100-EN, manufactured by Toshiba Machine Co., Ltd., to obtain an injection molded body having a length of 90 mm, a width of 150 mm and a thickness of 2 mm. For weld physical properties, an injection molded body having the same size as above was obtained at the opposing two-point gates.

(7) Flexural Modulus (FM)

The flexural modulus was measured under the conditions of a span length of 30 mm and a flexural rate of 1 mm/min using a specimen having a thickness of 2 mm which was injection molded under the above conditions, according to JIS K7171.

(8) Low-Temperature Impact Resistance (IZOD)

The low-temperature impact resistance was measured at a predetermined temperature using a specimen injection molded under the above conditions, according to JIS K6911. NB=Not Broken, B=Broken (9) Weld Physical Properties A No. 3 Dumbbell shaped specimen, which was injection molded under the above conditions at the opposing two-point gates, was tested at a testing speed of 200 mm/min, according to JIS K6251. The injection molded specimen was stamped out by disposing the dumbbell so that a weld line was approximately at the center between the indicator lines.

(10) Mold Releasability

The injection molding was carried out under the conditions of a cylinder temperature of 220° C. and a mold temperature of 25° C. using an injection molding machine, FS 160, manufactured by Nissei Plastic Industrial Co., Ltd. to obtain a molded body as shown in FIG. 1. The deformation state of a resulting molded body after release from the mold was evaluated. ○: almost no deformation, Δ: slight deformation, x: significant deformation

[II] Raw Material (1) Propylene Polymer (A1)

(PP-1): NOBLEN AX568, produced by Sumitomo Chemical Co., Ltd.

MFR (230° C.)=65 g/10 min, content of the monomer unit derived from propylene in the propylene polymer unit (α1)=100%, content of the monomer unit derived from ethylene in the ethylene copolymer unit (β1)=45% by weight, content of the ethylene copolymer unit (β1) in the component (A1)=16% by weight, intrinsic viscosity [η] of the 20° C. xylene soluble portion (CXS portion)=3.5

(PP-2): NOBLEN AX564E2, produced by Sumitomo Chemical Co., Ltd.

MFR (230° C.)=65 g/10 min, content of the monomer unit derived from propylene in the propylene polymer unit (α1)=100% by weight, content of the monomer unit derived from ethylene in the ethylene copolymer unit (β1)=40% by weight, content of the ethylene copolymer unit (β1) in the component (A1)=20% by weight, intrinsic viscosity [η] of the 20° C. xylene soluble portion (CXS portion)=2.0

(PP-3): NOBLEN WPX5343, produced by Sumitomo Chemical Co., Ltd.

MFR (230° C.)=52 g/10 min, content of the monomer unit derived from propylene in the propylene polymer unit (α1)=100% by weight, content of the monomer unit derived from ethylene in the ethylene copolymer unit (β1)=36% by weight, content of the ethylene copolymer unit (β1) in the component (A1)=13% by weight, intrinsic viscosity [η] of the 20° C. xylene soluble portion (CXS portion)=4.6

(2) Ethylene-Propylene Copolymer Rubber (B1)

(Rubber-1): Esprene SPO V0141, produced by Sumitomo Chemical Co., Ltd.

Ethylene-propylene copolymer, Ratio of ethylene/propylene=73/27, Mooney viscosity ($ML_{1+4}$, 125° C.)=33

(Rubber-2): Esprene 512P, produced by Sumitomo Chemical Co., Ltd.

Ethylene-propylene-5-ethylidene-2-norbornene copolymer, Mooney viscosity ($ML_{1+4}$, 125° C.)=64

(3) Ethylene Copolymer (C1)

(Copolymer-1): Engage 7380, produced by Dow Chemical Company

Ethylene-butene copolymer, Density=0.863 $g/cm^3$, MFR (190° C.)=0.3 g/10 min (Copolymer-2): Engage 8480, produced by Dow Chemical Company Ethylene-octene copolymer, Density=0.903 g/cm³, MFR (190° C.)=1.1 g/10 min (Copolymer-3): Engage 8100, produced by Dow Chemical Company Ethylene-octene copolymer, Density=0.871 g/cm³, MFR (190° C.)=1.1 g/10 min (Copolymer-4): Engage 8842, produced by Dow Chemical Company Ethylene-octene copolymer, Density=0.857 g/cm³, MFR (190° C.)=1.0 g/10 min (Copolymer-5): Engage 8407, produced by Dow Chemical Company Ethylene-octene copolymer, Density=0.870 g/cm³, MFR (190° C.)=30 g/10 min Example 1

A mixture was prepared by blending 46 parts by weight of (PP-1) as the component (A1), 12 parts by weight of (rubber-1) as the component (B1) and 21 parts by weight of (copolymer-1) and 21 parts by weight of (copolymer-2) as the component (C1), as well as 0.05 parts by weight of erucic acid amide (NEUTRON S, produced by Nippon Fine Chemical Co., Ltd.) and two antioxidants (0.1 parts by weight of Sumilizer GA80, produced by Sumitomo Chemical Co., Ltd. and 0.05 parts by weight of IRGAFOS 168, produced by Ciba Speciality K.K.) based on a total of 100 parts by weight of the components (A1), (B1) and (C1). The mixture was melt-kneaded by a Banbury mixer and then molded into a pellet shape to obtain a thermoplastic elastomer composition. The measurement results of the physical properties of the resulting thermoplastic elastomer composition and a molded body obtained by injection molding the composition are shown in Table 1.

Comparative Example 1

A thermoplastic elastomer composition was obtained in the same manner as in Example 1 except for using PP-2 as the component (A1). The measurement results of the physical properties of the resulting thermoplastic elastomer composition and a molded body obtained by injection molding the composition are shown in Table 1.

Examples 2 to 5

A thermoplastic elastomer composition was obtained in the same manner as in Example 1 except for blending the compositions shown in Table 2. The measurement results of the physical properties of the resulting thermoplastic elastomer composition and a molded body obtained by injection molding the composition are shown in Table 2.

Comparative Examples 2 to 7

A thermoplastic elastomer composition was obtained in the same manner as in Example 1 except for blending the compositions shown in Table 3. The measurement results of the physical properties of the resulting thermoplastic elastomer composition and a molded body obtained by injection molding the composition are shown in Table 3.

TABLE 1

|  | Ex. 1 | Com. Ex. 1 |
|---|---|---|
| PP-1 | 46 |  |
| PP-2 |  | 46 |
| Rubber-1 | 12 | 12 |
| Copolymer-1 | 21 | 21 |
| Copolymer-2 | 21 | 21 |
| MFR | 8 | 9 |
| Flexural Modulus (MPa) | 310 | 370 |
| Mold Releasability | ∆ | ∆ |
| Low-temperature Impact Resistance | ∆ | ∆ |
| −45° C. | B | B |
| −40° C. | NB | NB-B |
| Weld Physical Properties | ○ | X |
| Elongation at Break (%) | 650 | 170 |

TABLE 2

|  | Ex. 2 | Ex. 3 | Ex. 4 | Ex. 5 |
|---|---|---|---|---|
| PP-3 | 40 | 40 | 50 | 40 |
| Rubber-2 | 30 | 50 | 25 | 30 |
| Copolymer-2 |  |  |  | 30 |
| Copolymer-3 | 30 | 10 | 25 |  |
| Copolymer-4 |  |  |  |  |
| Copolymer-5 |  |  |  |  |
| MFR | 6 | 5 | 9.5 | 6 |
| Flexural Modulus (MPa) | 240 | 240 | 350 | 300 |
| Mold Releasability | ○ | ○ | ○ | ○ |
| Low-temperature Impact Resistance | ○ | ○ | ∆ | ∆ |
| −45° C. | NB | NB | B | B |
| −40° C. | NB | NB | NB | NB |
| Weld Physical Properties | ○ | ∆ | ○ | ○ |
| Elongation at Break (%) | 700 | 260 | 500 | 670 |

TABLE 3

|  | Com. Ex. 2 | Com. Ex. 3 | Com. Ex. 4 | Com. Ex. 5 | Com. Ex. 6 | Com. Ex. 7 |
|---|---|---|---|---|---|---|
| PP-3 | 40 | 40 | 40 | 60 | 40 | 40 |
| Rubber-2 | 10 | 60 |  | 20 | 30 | 30 |
| Copolymer-2 |  |  |  |  |  |  |
| Copolymer-3 | 50 |  | 60 | 20 |  |  |
| Copolymer-4 |  |  |  |  | 30 |  |
| Copolymer-5 |  |  |  |  |  | 30 |
| MFR | 6.5 | 4 | 5.5 | 14 | 6 | 9 |
| Flexural Modulus (MPa) | 250 | 250 | 250 | 530 | 230 | 250 |
| Mold Releasability | X | ○ | X | ○ | ○ | X |
| Low-temperature Impact Resistance | ○ | ○ | ○ | X | ○ | ○ |
| −45° C. | NB | NB | NB | B | NB | NB |
| −40° C. | NB | NB | NB | B | NB | NB |
| Weld Physical Properties | ○ | X | ○ | X | X | X |
| Elongation at Break (%) | 620 | 120 | 600 | 80 | 160 | 90 |

Composite Molded Body

[III] Methods for Measuring Physical Properties (1) Melt Flow Rate (MFR)

The MFR of the polypropylene resin (A2) and a thermoplastic elastomer composition was measured at 230° C. under a load of 2.16 kg, according to JIS K7210. The MFR of the ethylene copolymer (component (b3)) was measured at 230° C. under a load of 2.16 kg.

(2) Measurement Method for Intrinsic Viscosity [η]

A solution was prepared by completely dissolving 5 g of the polypropylene polymer in 500 ml of boiling xylene and then the solution was cooled to 20° C., followed by allowing it to stand for 4 hours or more. Thereafter, the resulting solution was filtered to obtain a precipitate and a filtrate. The filtrate was evaporated to dryness and dried under reduced pressure at 70° C. to extract a xylene soluble portion.

A reduced viscosity was measured using an Ubbelohde type viscometer and then the intrinsic viscosity [η] was determined by extrapolation of the reduced viscosity using the calculation method described in "Kobunshi Yoeki, Kobunshi Jikkengaku 11" (Polymer Solution, Polymer Experiment 11) (published by Kyoritsu Shuppan Co., Ltd. in 1982), page 491.

(3) Density

The density was measured without annealing according to JIS K7112.

(4) Mooney Viscosity

The Mooney viscosity was measured according to ASTM D-1646.

(5) Content of Monomer Unit Derived from Monomer in Resin

The composition of the ethylene-propylene copolymer rubber (b2) was determined by an infrared absorption spectrometer (Model FT-IR 5200, manufactured by JASCO Corporation), according to ASTM D 3900.

(6) Melting Peak Temperature

The polypropylene resin was heated from room temperature to 220° C. at a heating rate of 10° C./min and then cooled to −90° C. at a cooling rate of 5° C./min with no holding time. The resin was heated again from −90° C. to 200° C. at a heating rate of 10° C./min with no holding time. A peak value measured at the second heating operation was determined as the melting peak temperature. When a plurality of melting peaks is obtained, a peak value at the highest temperature side was taken.

(7) Production Method of Injection Molded Body

The thermoplastic elastomer composition (B2) was injection molded under the conditions of a cylinder temperature of 220° C. and a mold temperature of 50° C. using a side gate flat plate mold in an injection molding machine, IS 100-EN, manufactured by Toshiba Machine Co., Ltd., to obtain an injection molded body having a length of 90 mm, a width of 150 mm and a thickness of 2 or 3 mm. In addition, the polypropylene resin (A2) was injection molded under the same conditions as above to obtain an injection molded body having the same shape as above.

(8) Flexural Modulus (FM)

The flexural modulus was measured under the conditions of a span length of 30 mm and a flexural rate of 1 mm/min using a specimen having a thickness of 2 mm which was injection molded under the above conditions, according to JIS K7171.

(9) Low-Temperature Impact Resistance (IZOD)

The low-temperature impact resistance was measured at a predetermined temperature using a specimen comprised of the thermoplastic elastomer composition (B2) which was injection molded under the above conditions, according to JIS K6911. NB=Not Broken, B=Broken

(10) Vibration Welding Strength

A tabular specimen, which was injection molded under the above conditions, was cut out into a predetermined size and then subjected to vibration welding under predetermined conditions using a vibration welder (Model: 2800J-DC) manufactured by Branson Inc. to obtain a composite molded body as shown in FIG. 1. A specimen joined by vibration welding (a composite molded body in which a molded body comprised of the polypropylene resin (A2) and a molded body comprised of the thermoplastic elastomer composition (B2) are joined by vibration welding) was cut into a width of 60 mm, the molded body comprised of the polypropylene resin (A2) was fixed, and the molded body comprised of the thermoplastic elastomer composition (B2) was attached to the load cell jig of a tensile tester. Then, a peeling test was carried out at a speed of 200 mm/min, and the maximum value of the peeling strength was defined as the joint strength.

[IV] Raw Material (1) Polypropylene Polymer (b1)

(PP-11): NOBLEN AZ161C1, produced by Sumitomo Chemical Co., Ltd.

MFR (230° C.)=30 g/10 min, melting peak temperature=163° C., content of the monomer unit derived from propylene in the propylene polymer unit (α2)=100%, content of the monomer unit derived from ethylene in the ethylene copolymer unit (β2)=45% by weight, content of the ethylene copolymer unit (β2) in the component (b1)=16% by weight, intrinsic viscosity [η] of the 20° C. xylene soluble portion (CXS portion) as measured in tetralin at 135° C.=3.5

(PP-12): NOBLEN WPX5007, produced by Sumitomo Chemical Co., Ltd.

MFR (230° C.)=52 g/10 min, melting peak temperature=163° C., content of the monomer unit derived from propylene in the propylene polymer unit (α2)=100% by weight, content of the monomer unit derived from ethylene in the ethylene copolymer unit (β2)=45% by weight, content of the ethylene copolymer unit (β2) in the component (b1)=16% by weight, intrinsic viscosity [η] of the 20° C. xylene soluble portion (CXS portion) as measured in tetralin at 135° C.=3.4

(PP-13): NOBLEN Z144T, produced by Sumitomo Chemical Co., Ltd.

MFR (230° C.)=30 g/10 min, melting peak temperature=147° C., content of the monomer unit derived from propylene in the propylene polymer unit (α2)=96% by weight, content of the ethylene copolymer unit (β2) in the component (b1)=0% by weight (PP-14): NOBLEN WPX5343, produced by Sumitomo Chemical Co., Ltd.

MFR (230° C.)=52 g/10 min, melting peak temperature=164° C., content of the monomer unit derived from propylene in the propylene polymer unit (α2)=100% by weight, content of the monomer unit derived from ethylene in the ethylene copolymer unit (β2)=36% by weight, content of the ethylene copolymer unit (β2) in the component (b1)=13% by weight, intrinsic viscosity [η] of the 20° C. xylene soluble portion (CXS portion) as measured in tetralin at 135° C.=4.6

(PP-15): a polypropylene polymer in which MFR (230° C.)=35 g/10 min, melting peak temperature=167° C., intrinsic viscosity [η] of the 20° C. xylene soluble portion (CXS portion) as measured in tetralin at 135° C.=1.7

(2) Ethylene-Propylene Copolymer Rubber (b2)

(Rubber-11): Esprene 512P, produced by Sumitomo Chemical Co., Ltd.

Ethylene-propylene-non-conjugated diene copolymer, weight ratio of ethylene/propylene=67/33, Mooney viscosity $(ML_{1+4}, 125° C.)=64$ (Rubber-12): Esprene 201, produced by Sumitomo Chemical Co., Ltd.

Ethylene-propylene copolymer, weight ratio of ethylene/propylene=49/51, Mooney viscosity $(ML_{1+4}, 125° C.)=31$ (3) Ethylene Copolymer (b3)

(Copolymer-11): Engage 7467, produced by Dow Chemical Company

Ethylene-butene copolymer, Density=0.863 g/cm$^3$, MFR (190° C.)=1.3 g/10 min (Copolymer-12): Engage 8180, produced by Dow Chemical Company Ethylene-octene copolymer, Density=0.863 g/cm$^3$, MFR (190° C.)=0.4 g/10 min (Copolymer-13): Engage 8100, produced by Dow Chemical Company Ethylene-octene copolymer, Density=0.870 g/cm$^3$, MFR (190° C.)=1.1 g/10 min (4) Polypropylene Resin (A2)

NOBLEN BZE82F8, produced by Sumitomo Chemical Co., Ltd.

melting peak temperature=166° C., flexural modulus=1560 MPa

Example 6

A mixture was prepared by blending 100 parts by weight of (PP-11) as the component (b1), 80 parts by weight of (rubber-11) and 20 parts by weight of (rubber-12) as the component (b2), 0.1 parts by weight of erucic acid amide (NEUTRON S, produced by Nippon Fine Chemical Co., Ltd.), and 0.2 parts by weight of (Sumilizer GA80, produced by Sumitomo Chemical Co., Ltd.) and 0.1 parts by weight of (IRGAFOS 168, produced by Ciba Speciality K.K.) as an antioxidant. The mixture was melt-kneaded by a Banbury mixer and then molded into a pellet shape to obtain a thermoplastic elastomer composition (B2). The measurement results of the physical properties of the resulting thermoplastic elastomer composition (B2) and a molded body comprised of the composition are shown in Table 4.

Example 7

A thermoplastic elastomer composition (B2) was obtained in the same manner as in Example 6 except for changing the components and amount blended as shown in Table 4. The measurement results of the physical properties of the resulting thermoplastic elastomer composition (B2) and a molded body comprised of the composition are shown in Table 4.

Example 8

A thermoplastic elastomer composition (B2) was obtained in the same manner as in Example 6 except for changing the components and amount blended as shown in Table 4. The measurement results of the physical properties of the resulting thermoplastic elastomer composition (B2) and a molded body comprised of the composition are shown in Table 4.

Comparative Example 8

A thermoplastic elastomer composition (B2) was obtained in the same manner as in Example 6 except for changing the components and amount blended as shown in Table 4. The measurement results of the physical properties of the resulting thermoplastic elastomer composition (B2) and a molded body comprised of the composition are shown in Table 4.

TABLE 4

|  |  | Ex. 6 | Com. Ex. 8 | Ex. 7 | Ex. 8 |
|---|---|---|---|---|---|
| Composition of Thermoplastic Elastomer Composition (B2) (parts by weight) | PP-11 | 100 |  |  |  |
|  | PP-12 |  |  | 100 | 100 |
|  | PP-13 |  | 100 |  |  |
|  | Rubber-11 | 80 | 80 | 63.6 | 63.6 |
|  | Rubber-12 | 20 | 20 |  |  |
|  | Copolymer-11 |  |  | 18.2 |  |
|  | Copolymer-12 |  |  |  | 18.2 |
| MFR of Thermoplastic Elastomer Composition (B2) (g/10 min) |  | 6 | 4 | 9 | 8 |
| Flexural Modulus of Molded Body Comprised of Thermoplastic Elastomer Composition (B2) (MPa) |  | 430 | 260 | 500 | 490 |
| Low-temperature Impact Resistance of Molded Body Comprised of Thermoplastic Elastomer Composition (B2) (Evaluation Temperature: −40° C. |  | NB | NB | NB | NB |
| Joint Strength of Composite Molded Body (Kg) |  | 33 (*1) | 14 (*1) | 36 (*2) | 39 (*2) |

Vibration Welding Conditions;
(*1) Vibration frequency = 240 Hz, welding depth = 0.5 mm, thickness of a molded body comprised of thermoplastic elastomer composition (B2) = 2 mm
(*2) Vibration frequency = 240 Hz, welding depth = 0.5 mm, thickness of molded body comprised of thermoplastic elastomer composition (B2) = 3 mm

Examples 9 to 12

A thermoplastic elastomer composition (B2) was obtained in the same manner as in Example 6 except for changing the components and amount blended as shown in Table 5. The measurement results of the physical properties of the resulting thermoplastic elastomer composition (B2) and a molded body comprised of the composition are shown in Table 5.

TABLE 5

|  |  | Ex. 9 | Ex. 10 | Ex. 11 | Ex. 12 |
|---|---|---|---|---|---|
| Composition of Thermoplastic Elastomer Composition (B2) (parts by weight) | PP-14 | 100 | 100 | 100 | |
| | PP-15 | | | | 100 |
| | Rubber-11 | 92.3 | 73.1 | 46.15 | 73.1 |
| | Copolymer-13 | | 19.2 | 46.15 | 19.2 |
| MFR of Thermoplastic Elastomer Composition (B2) (g/10 min) | | 9 | 10 | 12 | 7 |
| Flexural Modulus of Molded Body Comprised of Thermoplastic Elastomer Composition (B2) (MPa) | | 500 | 480 | 450 | 330 |
| Low-temperature Impact Resistance of Molded Body Comprised of Thermoplastic Elastomer Composition (B2) (Evaluation Temperature: −40° C. | | NB | NB | NB | NB |
| Joint Strength of Composite Molded Body (Kg) | | 40 (*2) | 62 (*2) | 56 (*2) | 29 (*2) |

Vibration Welding Conditions;
(*1) Vibration frequency = 240 Hz, welding depth = 0.5 mm, thickness of a molded body comprised of thermoplastic elastomer composition (B2) = 2 mm
(*2) Vibration frequency = 240 Hz, welding depth = 0.5 mm, thickness of molded body comprised of thermoplastic elastomer composition (B2) = 3 mm

INDUSTRIAL APPLICABILITY

The present invention provides a thermoplastic elastomer composition which has required properties such as melt flowability during injection molding, mold releasability when a molded body is released from a mold, low-temperature resistance of an airbag cover molded body obtained by injection molding and weld physical properties in a balanced manner. An airbag cover molded body of the present invention, which is obtained by injection molding the thermoplastic elastomer composition, has required properties such as melt flowability during injection molding, mold releasability when a molded body is released from a mold, low-temperature resistance of an airbag cover molded body obtained by injection molding and weld physical properties in a balanced manner.

In addition, the present invention provides a composite molded body in which a molded body comprised of a thermoplastic elastomer composition excellent in mechanical properties such as low-temperature impact resistance, shape retention properties and workability when modularizing with other airbag parts and a molded body comprised of a polypropylene resin are firmly joined and integrated together by vibration welding.

The invention claimed is:

1. A method for producing a composite molded body, the method comprising vibration welding to join together a molded body comprised of the following polypropylene resin (A2) and a molded body comprised of the following thermoplastic elastomer composition (B2):

(A2): a polypropylene resin having a flexural modulus of 1500 MPa or more and a melting peak temperature of 163° C. or more, as measured by a differential scanning calorimeter; and (B2): a thermoplastic elastomer composition containing a polypropylene polymer (component (b1)) having a melting peak temperature 7° C. or less lower than that of the polypropylene resin (A2) and an ethylene-propylene copolymer rubber (component (b2)) having a weight ratio of the monomer unit derived from ethylene to the monomer unit derived from propylene of from 30/70 to 75/25 (provided that the total of the monomer unit derived from ethylene and the monomer unit derived from propylene in the component (b2) is 100% wt) and having a flexural modulus of 330 to 800 MPa, wherein the thermoplastic elastomer composition (B2) further contains, as a component (b3), an ethylene copolymer of ethylene and α-olefin having 4 or more carbon atoms having a density of 0.860 to 0.870 g/cm$^3$ and a melt flow rate of 0.3 to about 1.3 g/10 min as measured at 190° C. under a load of 21.18 N, wherein the thermoplastic elastomer composition (B2) contains 100 parts by weight of the component (b1), 46.15 to 100 parts by weight of the component (b2) per 100 parts by weight of the component (b1) and 5 to 90 parts by weight of the component (b3) per 100 parts by weight of the component (b1), wherein the component (b1) is the polypropylene polymer comprised of 70 to 90% by weight of the following propylene polymer unit (α2) and 10 to 30% by weight of the following ethylene copolymer unit (β2) (provided that the total amount of the component (b1) is 100% by weight):

(α2): the propylene polymer unit obtained by polymerizing a monomer composed mainly of propylene in the first step; and (β2): the ethylene copolymer unit obtained by copolymerizing ethylene with propylene and/or an α-olefin having 4 or more carbon atoms in the second step, wherein the content of the monomer unit derived from ethylene is 20 to 80% by weight, provided that the amount of the ethylene copolymer unit is 100% by weight, and wherein a 20° C. xylene soluble portion (CXS portion) contained in the component (b1) has an intrinsic viscosity [η] of 3.0 to 8.0 as measured in tetralin at 135° C.

2. The method according to claim 1, wherein the composite molded body is an automobile interior part.

* * * * *